Figure 1:
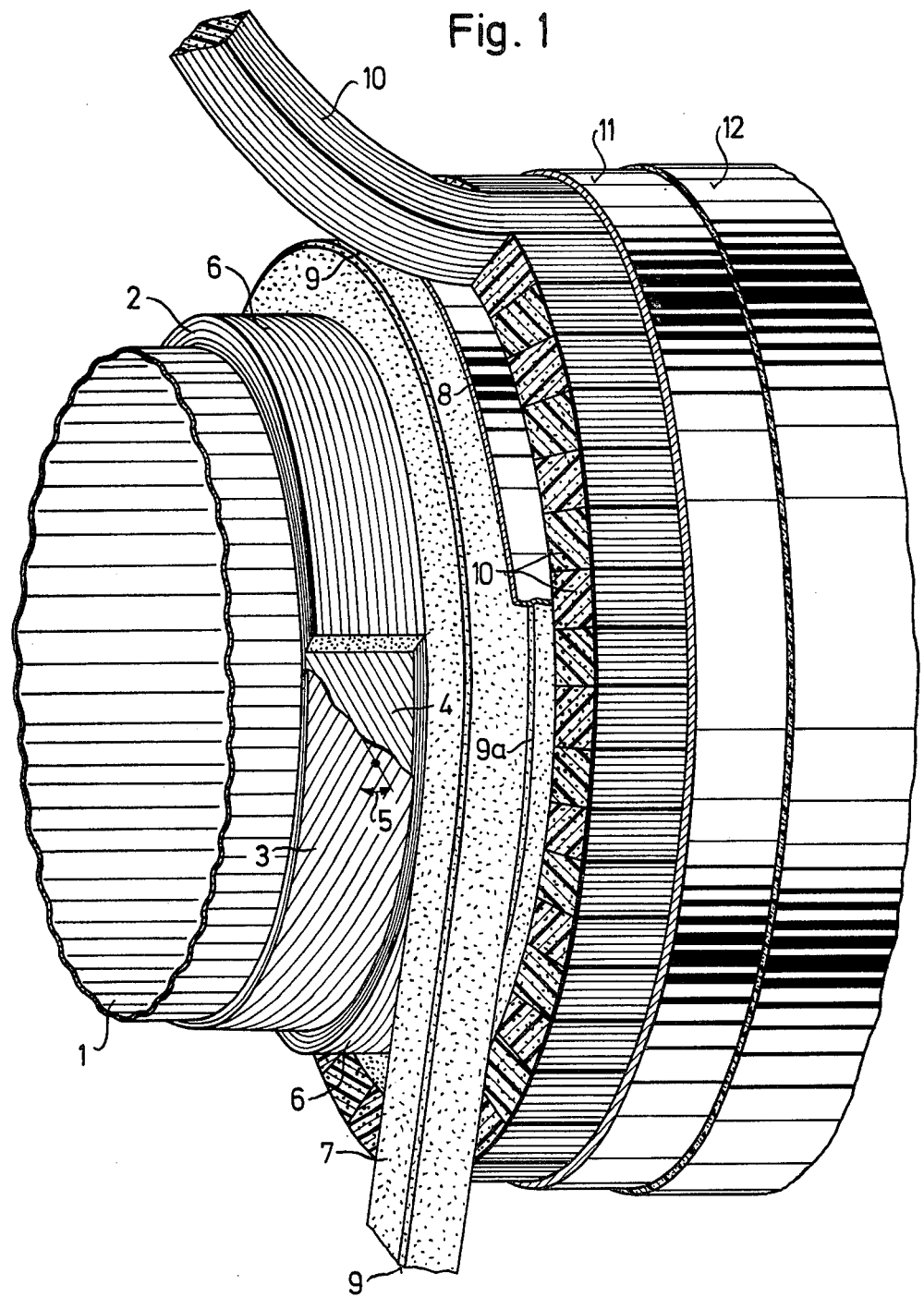

United States Patent [19]

Laing

[11] 4,106,528
[45] Aug. 15, 1978

[54] TUBE FOR FLUID SUBSTANCES UNDER PRESSURE

[76] Inventor: Nikolaus Laing, Hofener Weg 35 bis 37, 7141 Aldingen bei Stuttgart, Germany

[21] Appl. No.: 533,308

[22] Filed: Dec. 16, 1974

[30] Foreign Application Priority Data

Dec. 19, 1973 [AU] Australia .................... 210625/73

[51] Int. Cl.² ................................................ F16L 9/14
[52] U.S. Cl. ................................. 138/149; 138/130; 138/131; 138/178
[58] Field of Search ............... 138/130, 131, 148, 149, 138/144, 178

[56] References Cited

U.S. PATENT DOCUMENTS

| | | | |
|---|---|---|---|
| 790,906 | 5/1905 | Marks | 138/130 X |
| 1,726,957 | 9/1929 | Hughes | 138/130 X |
| 2,969,092 | 1/1961 | Johnston | 138/149 |
| 2,969,812 | 1/1961 | De Ganahl | 138/130 X |
| 3,091,946 | 6/1963 | Kesling | 62/465 |
| 3,107,698 | 10/1963 | Baker et al. | 138/130 |
| 3,117,597 | 1/1964 | Fritz et al. | 138/130 X |
| 3,212,528 | 10/1965 | Haas | 138/130 |
| 3,295,558 | 1/1967 | Levenetz | 138/140 |
| 3,367,530 | 2/1968 | Kordyban et al. | 138/149 X |
| 3,429,758 | 2/1969 | Young | 138/144 X |
| 3,430,663 | 3/1969 | Sickbert | 138/148 |
| 3,565,118 | 2/1971 | Stearns | 138/148 X |
| 3,651,661 | 3/1972 | Darrow | 138/149 X |
| 3,695,483 | 10/1972 | Pogorski | 138/149 X |
| 3,728,187 | 4/1973 | Martin | 138/149 X |
| 3,729,028 | 4/1973 | Horvath et al. | 138/130 |
| 3,810,491 | 5/1974 | Hildebrandt | 138/149 |
| 3,812,886 | 5/1974 | Hallwood | 138/149 |
| 3,830,288 | 8/1974 | Laing | 165/32 |
| 3,850,714 | 11/1974 | Adorjan | 138/149 X |

Primary Examiner—Richard E. Aegerter
Assistant Examiner—James E. Bryant, III
Attorney, Agent, or Firm—Pennie & Edmonds

[57] ABSTRACT

A composite pressure tube for the transport of hot fluid substances is proposed consisting of a very thin internal metal tube and a layer of mineral fibres, which are arranged in laminations wound cross-wise above each other and which carry at least the hoop stresses of the tube. These fibres are so wound that each is liable to take up equal tension loading.

21 Claims, 2 Drawing Figures

U.S. Patent   Aug. 15, 1978   4,106,528

TUBE FOR FLUID SUBSTANCES UNDER PRESSURE

THE PRIOR ART

The transport of fluid substances at high temperatures in combination with high pressures, e.g. of hot water or superheated steam, is associated with great difficulties. Materials used hithereto, particularly steel, are suitable only up to a certain temperature limit; beyond this limit, the strength diminishes very greatly. The decisive drawback of steel tubes is, however, the heavy weight. Thus, steel pipelines can be constructed only at the cost of a high input of material. The substances used for the thermal insulation of such pipelines, e.g. formed mica, are of low strength only and cannot, therefore, carry mechanical loads. A property of isotropic, e.g. metal, tubes is the unequal loading of the material. The hoop stress, i.e. the tensile loading of a tube in the circumferential direction, is twice as large as the stress in the longitudinal direction. Thus, if the wall is to contain the hoop stress, it must be twice as thick as would be necessary to take the axial stress only.

Futhermore, pipelines are known in which, over a core tube, a plurality of coaxial fibre laminations are arranged, wherein the fibres intersect in adjacent laminations, whereby a system of superimposed fibre laminations is created.

THE OBJECT OF THE INVENTION

An object of the invention is a composite tube for fluid substances under pressure, the wall of which consists of several layers. A further object of the invention is a pipeline which can be made in any desired lengths for the transport of fluid substances at high temperatures over long distances. A further object of the invention is a pipeline which can be exposed to high temperatures and pressures by the transported fluid and wherein the wall elements loaded by tensile stress are so designed that their load capacity in the circumferential direction is larger than in the axial direction. In addition, the invention has the aim of creating a composite laminated tube which, under an internal pressure, carries approximately equal stresses in all laminations.

DESCRIPTION OF THE INVENTION

According to the invention, a hollow cylindrical space between two coaxial, gas-tight, thin-walled tubes separated by a radial distance contains a hollow cylinder built up of mineral fibres spun into yarns which carry the circumferential and axial tensile stresses. The fibres in superimposed laminations touch each other at intersection points and thereby create a multiplicity of small hollow spaces so that the entire hollow cylinder becomes effective as an insulating layer. Separate laminations of the hollow cylinder may be wound in coiled form, where, according to the invention, the pitches of the helically wound yarns are so chosen that these yarns carry equal tensile forces irrespective of the diameter of the lamination. This result can be achieved e.g. by yarn pitch angles which so diminish with incressing radius that the lengths and, therefore, the elongations of all fibers are approximately equal under equal temperature conditions. Approximately equal temperature conditions are understood as conditions in the hollow cylinder under which the extensions of the yarns caused by tensile stresses are approximately equal independently of the radius of the respective lamination.

At greatly unequal temperatures between the inside and outside laminations, the pitch angles should, according to the invention, be so chosen as a function of the radius that the constant tensile loading defined above is preserved even with different thermal strains. Thus, the winding length of the innermost lamination must be shorter relative to the outermost lamination than with a small temperature difference between the inside and outside lamination.

A further possibility of keeping the tensile load constant is the winding of the outside lamination with greater pre-tension than the inside lamination. A still further possibility of keeping the tensile load constant is to vary the amount of twist or twining of the individual yarns of the windings making up the individual laminations such that all the yarns are stretched evenly under forces resulting from the fluid under pressure up to the rupture point of the individual fibers comprising the yarns. Finally, it is also possible, according to the invention, so to vary the material of the fibers as a function of the radius of the winding that the thermal expansion coefficient is larger in the outside than in the inside lamination.

Thus, the invention provides composite tubes, the hoop stress loaded elements of which comprise yarns which are, for example, spun of mineral fibres. According to the invention, the yarns can also simultaneously serve for carrying the axial stresses and will then be so arranged, e.g. along helical lines at such a helix angle, that the resultant vector of the axial and circumferential stresses approximately coincides with the direction of the yarn. In this way, the yarn is loaded only by a tensile stress and its tensile strength is utilised in an optimum manner in all regions of the hollow cylinder. The superimposed, helically formed yarns of opposite hand in adjacent laminations, fasten against each other as soon as the internal pressure becomes effective. Hollow cylinders made of fibrous yarns can also be pre-fabricated. To this end, many cylinders of different diameters may be nested within each other where each is staggered by half a length so that the longitudinal stress of the tube is transmitted by friction forces. However, it is also possible to use intermediate elements for carrying the circumferential stress. In this case, the circumferential stress is carried by pre-fabricated hollow cylinders or by hollow cylinders wound around the internal tube whilst the axial forces are carried by yarns or twines running approximately parallel to the axis.

Composite tubes in which the hollow cylinder, arranged between the coaxial tubes, carries the tensile stresses of the tube wall and which comprises of alternating yarn laminations of opposite hand wound about the axis can be manufactured in a known manner in situ by yarn producing devices which have a plurality of rotating spinning heads or guide rollers, wherein adjacent heads or rollers rotate in opposite directions. The feed motion of these devices and the outlet speed of the yarns, e.g. out of the spinning heads, determine the pitch angle of the yarns in the individual laminations. In this case, the two conncentric tubes, between which the fibre layer is situated, have the function of protecting the fibre layer, which also serves as an insulating layer against the penetration of liquid. In one form of embodiment according to the invention the intermediate space between the coaxial tubes, wherein the tension loaded fibre layer is situated, will be evacuated in order to enhance the insulating properties of the pipeline.

In a further form of embodiment according to the invention, the fibres of the outside fibre lamination are wound with relatively small pitch angles only, so that the intersection angles of the fibres of adjacent fibre laminations are very small in this region. Such fibre laminations which only carry hoop stresses can be prefabricated in the simplest manner as cylindrical elements which can be successively pushed over the internal metal tube. In this case, the external tube is so designed that it carries the tensile stress in the longitudinal direction. Since the outside tube is insulated by the fibre layer from the high temperature inside the pipeline, it can be made of ordinary steel or of a fibre-reinforced resin in which the fibres have a prevailing axial direction.

In order to enhance the insulating properties of the composite tube, a further layer of insulating material, preferably of compressed mineral powder, can be provided, in addition, between the insulating fibre layer and the external tube.

If the function of carrying the hoop stresses is assumed by an inside hollow cylinder, whilst the axial stresses are transmitted by an outside hollow cylinder, the invention provides that the insulating layer is arranged between the two hollow cylinders.

Composite tubes built up in this way are incomparably more cost effective than steel tubes. Whilst steels applied in long-distance pipelines have a tensile strength between 28 and 40 kp/mm$^2$, fibres of a few micrometers diameter have tensile strengths of 500 kp/mm$^2$. In this way, the total cross-sectional area can be reduced to about one twelfth, thanks to the tensile strength of the material alone. Furthermore, the fibres which are strategically favourably positioned according to the invention, e.g. fibres of china clay, alumina, or even basalt but also glass fibres, have a specific weight which is about one third to one quarter of the specific weight of steel. A factor builds up from these contributions leading to a composite tube weight which is 40 times smaller than that of a conventional tube. The significance of this gain is the greater the higher the required inside pressure and temperature of such tubes, because, already at 350° C, the strength of steel drops to about one third.

Since the elastic modulus of mineral fibres is extremely large, only small elastic deformation takes place when the inside pressure rises. The deformation is usually within such narrow limits that the elastic deformation of the inserted metal tube which takes on the sealing function is negligibly small. However, small corrugations of the wall of the inside tube approximately parallel to the axis (fluted tube) can also be provided. The corrugations are so chosen, that, under operating pressure, a circular cylinder shape is restored.

For larger layer thicknesses of the axially loaded hollow cylinder in the composite tube wall, the invention provides that the superimposed yarn laminations are made of materials with different elastic moduli, namely, in such a way that the fibres in the outside laminations have, in each case, an elastic modulus larger than that of the fibres just inside. In this way, the laminations further inside are subject to a larger elastic deformation than the laminations further outside so that the changes of length as a function of the radius of each lamination are about the same and the fibres are subject to the same tensile stresses in all laminations. At very high temperatures, it is possible, by suitable choice of materials, to ensure that this requirement is automatically fulfilled because the inside layers, owing to their higher temperature, have a smaller elastic modulus than the outer, cooler layers.

To fix the fibres within the yarns, not only friction locking can be used but binding agents can also be applied in a manner known per se. At high temperatures, polyimides are particularly suitable with which tubes for operating temperatures of up to 350° C can be made. For temperatures beyond this limit, binding agents on a mineral basis are possible, e.g. water glass. In this arrangement, the volume of the binding agent should be substantially smaller than the volume of the interspaces between the fibres. A further fixing method consists, according to the invention, in that additional fibres lying approximately at right angles to the main fibre direction are inserted of a material with a melting point substantially below the melting point of the main tension-loaded fibres. As soon as the hollow cylinder is made, it is heated once, whereby these additional fibres, which need only amount to a few percent by weight of the main fibres, are made to fuse and thus to join the main tension-loaded fibres with a fusible material, e.g. a metal, and that this material has a melting point below the melting point of the fibres, so that the coating material, on heating up, concentrates by capillary forces in the contact regions of adjacent fibres and permanently binds them. The infra-red reflection is simultaneously increased by this coating whilst the ultimate tensile strength is reduced.

It has been found that intermediate layers of crystalline powder, particularly china clay but also volcanic ash or alumina powder achieve a further improvement in heat insulation. At very high temperatures, the invention provides that the regions near the inside consist of higher melting point fibres and the outer regions consist of lower melting point fibres, e.g. alumina fibres for the inner region and glass fibres for the outer region.

It is furthermore pointed out that a distinguishing feature of the invention is the fact that the interspaces between the fibres or yarns are not filled with a filler substance (matrix). This feature applies particularly to the yarns or fibres which carry the hoop stress and are laid directly over the internal metal tube. The yarns may consist of monofilar fibres (filaments). They can also be twisted of several filaments. However, yarns made of mineral chopped strand fibres produced by twisting these fibres, are preferred.

The longitudinal stresses, i.e. the tension loads in the axial direction can be carried by the yarn laminations wound cross-wise, as already mentioned above. However, tensile elements may also be arranged outside the insulating layer running in the axial direction of the tube, which carry the longitudinal tube tension loads. Such elements may consist of fibre bundles or yarn bundles which extend in the longitudinal direction of the tube. However, glass fibre reinforced synthetic resin tubes or metal tubes may also be used for this purpose. In this case, the external tube, which is situated outside the insulating layer, and thus is not subject to diminished strength, carries the longitudinal stresses.

In a preferred form of embodiment according to the invention, the insulating layer is situated between two gas tight tubes and the annular space between these tubes is evacuated. This form of embodiment has already been referred to above. It has been found that particularly favourable results can be achieved if the entire temperature drop takes place between the inside and the outside of the insulating layer, so that an outer lamination, which carries the longitudinal stresses, assumes the outside temperature and an inner lamination, which carries the hoop stresses, assumes the inside temperature of the pipeline. In this case, all fibres in the inner lamination carrying the hoop stresses have the same temperature so that the elongation under tensile loading and the thermal expansions of all fibres in the lamination are equal. If so, the form of embodiment in which the helical lines followed by the yarn windings have equal lengths in each lamination independently of its distance from the centreline of the composite tube, is the preferred form of embodiment. In the form of embodiment wherein the fibres carrying the hoop stresses and the insulating layer are arranged together between the internal metal tube and an external gas tight tube and wherein the annular space between these two tubes is evacuated, the pore size in the insulating layer is chosen to be substantially smaller than the size of the interspaces between the fibres wound cross-wise. The evacuation of the annular space between the tubes is only carried out far enough to ensure that the mean free path of the gas particles in the evacuated space is longer than the pore dimensions in the insulating material but shorter than the size of the interspaces between the fibres so that the Knudsen effect prevails only within the insulating layer and this layer is, by an order of magnitude, better insulated than the fibre layer. In this way, the localisation of the entire temperature drop within the insulating layer can be achieved.

The invention is explained by way of example with the help of FIGS.

FIG. 1 shows the layered construction of a preferred form of embodiment according to the invention.

Figure 2:
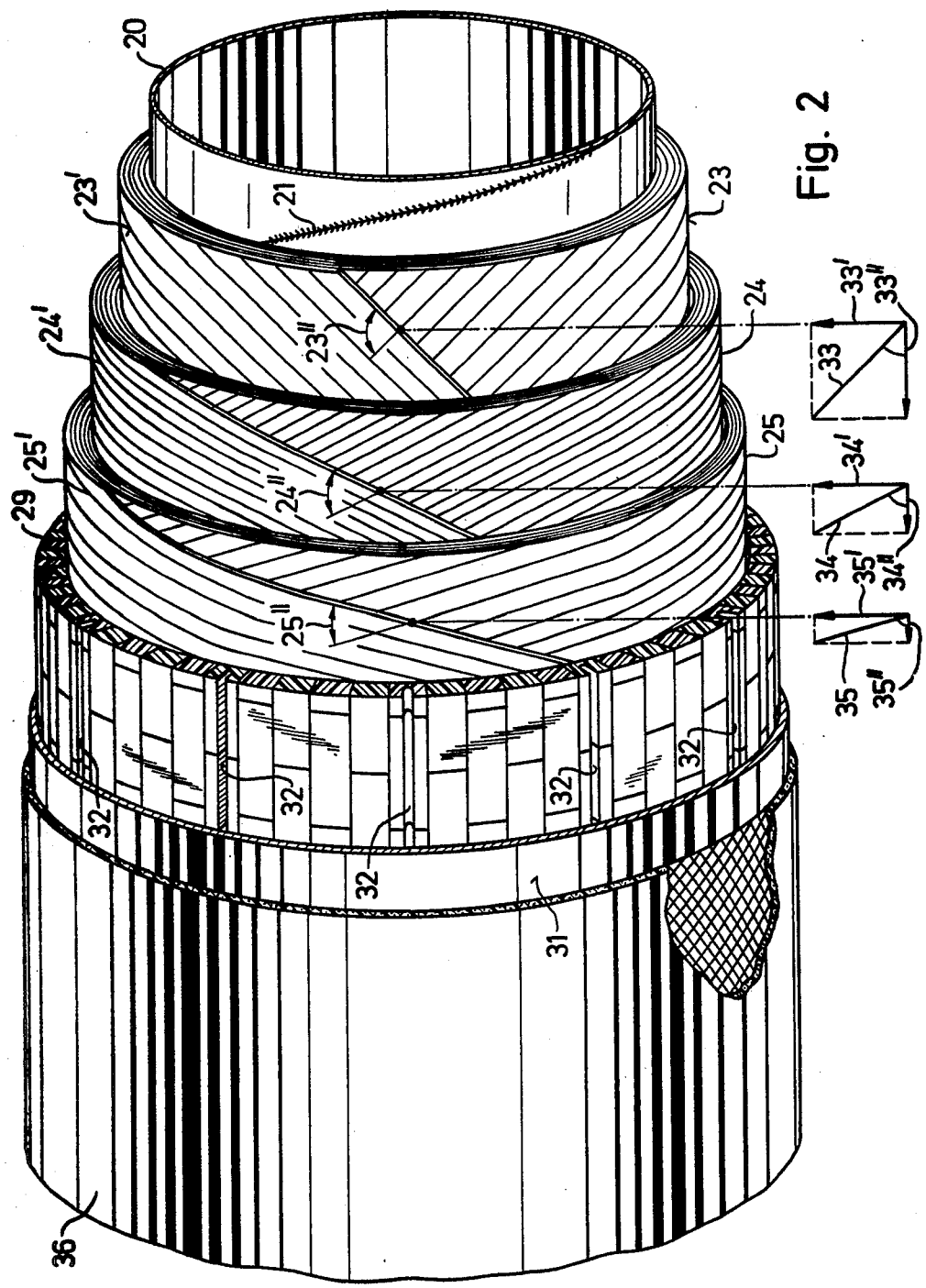

FIG. 2 shows the layered constrution of a further form of embodiment according to the invention. FIG. 1 shows a pressure tube according to the invention having a plurality of superimposed layers in which, for graphic clarity, the individual layers are shown of much greater thickness than they should have in reality. The innermost layer comprises a thinwalled tube 1 of stainless steel which is impervious to the fluid to be transported. This tube is slightly fluted approximately parallel to the axis so that the tube diameter can slightly expand under operating pressure. A hollow cylinder 2 surrounds tube. Yarns 3 and 4 which are formed of mineral fibres are wound about the tube 1 to form windings which in turn form successive laminations superimposed upon one another. The yarns 3 and 4 are wound in a helical manner and on opposite hands such that they form an angle 5 between them which is twice the pitch angle that the yarns make with a radial plane extending perpendicular to the axially extending axis of the tube. This angle diminishes progressively in the laminations lying above and finally becomes zero, so that the outer laminations 6 are practically parallel. This inner hollow cylinder can be pushed over the inside tube 1 in the shape of sleeves of a length, for example, five to twenty times the tube diameter. The hollow cylinder can, however, be directly wound on to the internal tube with the help of suitable winding machines. As soon as the fluid is under pressure, the wall of the tube is stretched. In this way, the yarns 3 and 4 and all yarns lying above them up to the yarns 6 are subject to a pre-tension. The inner yarns 3 and 4 are wound along helical lines such that the length of one turn of the helix is about the same as that of the outer yarns 6. In this way, all the yarns both in the inner and the outer laminations become equally loaded in tension so that all the yarns of the hollow cylinder 2 are mechanically loaded in an optimum manner when the tube is subjected to internal fluid pressure. A strand 7 is wound around these yarns. The strand consists of a highly porous insulating material, e.g. very finely ground volcanic slag with a binding agent possessing a certain elasticity. This strand 7 is wound in the shape of a helical coil and later provides the insulation. Around this insulation layer, a cylinder formed of very thin sheet metal is arranged. This cylinder is preferably also wound as a coil and carefully welded along the entire circumference; to form a gas tight outer tube 8 so that a vacuum-tight space is situated between the internal tube and this thin-walled sheet metal tube 8. The space is later evacuated through suitable conduits. These conduits 9 are formed by providing chamfers on the strands 7. They communicate with pipelines which lead to the outside. In this form of embodiment, the annular space to be evacuated is enclosed by the metal tube 1 and 8, so that the layer 2 which carries the hoop stresses as well as the insulating layer 7 are situated in the evacuated space. As stated above, the insulating layer 7 has a substantially smaller pore size than the layer 2 so that, at the corresponding pressure, the Knudsen effect can be made to prevail solely in this layer 7 and, in this way, the entire temperature difference between the inside and the outside is localised in this layer. In a further form of embodiment according to the invention, yet another gas tight metal tube can be provided between the layer 2 consisting of fibre windings carrying the hoop stresses and the insulating layer 7, so that the annular space between this additional metal tube and the external metal tube 8 can now be evacuated.

Axially parallel strands 10 are arranged around the thinwalled metal cylinder 8. These strands extend essentially over the entire length of the tube and are clamped at both ends. The strand 10 which carry the tensile load in the longitudinal direction may consist of glass fibres embodied in rubber or in a synthetic resin. The strands are protected against heating up by the insulating layer 7 and are thus practically at the outside temperature.

A protective tube 11 is arranged around these strands 10, which serve to carry the axial stresses. This protective tube is in turn, coated with a layer 12 to insulate against soil moisture. The evacuation of the annular space between the tube 1 and the tube 8 takes place during the first heating up of the tube. During this heating up period, the binding agent in the strand evaporates. The gases are extracted until the Knudsen effect can be implemented. In this way, practically the entire temperature drop takes place between the internal tube 1 and the tube 8. The distances between the fibres in the yarns 3, 4 and 6, compared to the spacings of the highly pulverised body of the strand 7, are so much larger that no significant temperature drop occurs inside the fibres because, at the vacuum used, no superinsulation effect takes place as yet.

The entire temperature drop, therefore, takes place within the radial extent of the insulating layer 7. Thus, the strands 10, which serve to carry the axial stresses, lie outside the layer 7 and need not consist of heat-resisting material. They can, for example, be made of glass fibre which is embedded in a matrix of elastic resin material.

FIG. 2 shows a different construction of the composite tube according to the invention. Here, too, the difference in diameters between the inside tube 20 and the outside tube 31 is in practice only about 1/10 to 1/100 of the tube diameter. The inside of the thin-walled tube is welded continuously as a spiral tube along the seam 21.

The bottom lamination 23, 23' of the load-carrying hollow cylinder built up of yarns are situated above this tube. The lamination 24 and 24' are arranged further up and, higher still, the laminations 25 and 25'. An insulating layer 29 is situated outside these laminations. The insulating layer consists of individual brick-shaped insulating bodies which are inserted into the outside tube in a staggered pattern. Some of these insulating bodies have grooves 32 through which the gas extraction takes place during evacuation. The outside tube 31 is, in turn protected by a bitumen coating 36. The yarns 23 and 23' of the innermost laminations have an included angle 23" between them. The hoop load component 33' of the fibre load 33 is almost as large in this lamination as the axial component 33". In this lamination, the hoop load vector 33' is less different from the axial load vector 33" than in the adjacent or neutral lamination in which the included angle 24" between the yarns 24 and 24' is smaller, so that the hoop load component 34' becomes relatively larger compared with the axial component 34". The included angle 25" between the yarns 25 and 25' is even smaller. Accordingly, in the outermost lamination, the hoop load vector 35' is more than twice as large as the axial load vector 35", whilst, by comparison, the vector 33' is less than twice as large as the axial vector 33". The hollow body 23 to 25, consisting of yarns, is preferably made only during pipeline laying over the entire length of the pipe and clamped at the ends for relief of tension. This form of envelope thus carries both the axial and the circumferential forces. The inner layers carry a larger part of the hoop stress and the outer layers a larger part of the axial stresses. The angular positions are preferably so chosen that the angles 24" in the intermediate or neutral laminations amount to about 54°, whilst the yarns 23 and 23' in the laminations below include a larger angle 23" and the yarns in the laminations above include a smaller angle 25". According to the invention, the load-carrying hollow cylinder 23 and 25 can itself be made to contribute to the insulation. In this case, it is profitable to insert between the yarns a powder of an inorganic substance. As a rule, the pressure here, too, will be so chosen that the knudsen effect does not occur within the load-carrying hollow cylinder 23 to 25 so that a very small temperature drop only is established across it, whilst the overwhelming part of the temperature drop takes place in the insulating layer 29 because there the pores between the separate particles are so small that they lie below the mean free path of the enclosed gas.

Both light and heavy gases are suitable for this purpose. Light gases have the advantage of a larger mean free path. Thus, the Knudsen effect takes place already at a higher absolute pressure than in heavy gases. However, heavy gases are more advantageous when the pore dimensions of the insulating layer 29 can be maintained small enough. If so, water vapor, nitrogen, carbon dioxide or sulphur dioxide are especially suitable as are gases containing fluorohydrocarbon compounds, argon or methylchloride.

I claim:

1. A pressure tube for the transport of fluid under pressure comprising a plurality of superimposed tubular layers including an inner thin-walled fluid impervious metal tubular layer, an outer tubular layer comprising windings of yarns formed from mineral fibers where said yarns carry the hoop stresses of the pressure tube resulting from the fluid under pressure, a porous insulating layer overlying said windings, axially extending yarns for carrying axial stresses positioned radially outwardly of said insulating layer, and a hermetically sealed tubular wall positioned between the layer of insulating material and the axially extending yarns and wherein the space between the hermetically sealed tubular wall and said metal tubular layer is evacuated.

2. A pressure tube according to claim 1 having in addition a gas in said annular space and wherein the porous insulating layer has pore diameters and wherein the pressure of the gas is such that the means free path of the gas is larger than said pore diameter.

3. A pressure tube according to claim 1 wherein said windings form a plurality of successive superimposed laminations following helical lines of opposite hand and where the pitch angle of the helical lines varies as a function of the radial distance of the laminations from the axial extending axis of the tube whereby the tensile loading of all the mineral fibers resulting from the fluid under pressure remains substantially the same.

4. A pressure tube according to claim 1 having in addition axially extending yarns for carrying axial stresses positioned radially outwardly of said insulating layer.

5. A pressure tube according to claim 3 characterized in that the successive laminations include inner and outer laminations and in that the angle between helical lines of opposite hand of inner laminations exceeds 54° and in that the angle between the helical lines of opposite hand of outer laminations is less than 54°.

6. A pressure tube according to claim 1 characterized in that said annular space occupied by the windings is partially evacuated of gas to the extent that the mean free path of remaining enclosed gas is larger than the mean distance between the mineral fibers forming each of the yarns.

7. A pressure tube according to claim 1 having in addition a porous insulating layer positioned in said annular space between said windings and said outer tube and further characterized in that said annular space is evacuated to the extent that the mean free path of the enclosed gas is smaller than the diameter of the mineral fibers and larger than the pore diameter of the porous insulating layer.

8. A pressure tube according to claim 1 characterized in that said windings form a plurality of laminations and where the windings forming successive laminations are wound with different pretensions.

9. A pressure tube according to claim 3 wherein the length of yarn per winding is the same for all laminations.

10. A pressure tube according to claim 3 characterized in that the pitch angle of the windings of the outermost lamination is so arranged that the resolution of the forces in the individual yarns forming a single winding resulting from fluid under pressure into circumferential and axial force vectors produces a force vector in the circumferential direction twice as large as the force vector in the axial direction.

11. A pressure tube according to claim 3 characterized in that the largest part of axial forces is carried by inner laminations.

12. A pressure tube according to claim 1 wherein the yarns are firmly attached to each other at their contact points.

13. A pressure tube according to claim 1 wherein said gas comprises water vapor.

14. A pressure tube according to claim 1 wherein said gas comprises nitrogen.

15. A pressure tube according to claim 1 wherein said gas comprises carbon dioxide.

16. A pressure tube according to claim 1 wherein said gas includes a fluorohydrocarbon compound.

17. A pressure tube according to claim 1 wherein said gas comprises argon.

18. A pressure tube according to claim 1 wherein said gas comprises methylchloride.

19. A pressure tube according to claim 1 having in addition a gas in the said space under sub-atmospheric pressure.

20. A pressure tube according to claim 1 having a gas in said annular space at a pressure whereby the mean free path of the gas is smaller than the diameter of the mineral fibers forming the yarns and larger than the pore diameter of the insulating layer.

21. A pressure tube according to claim 1 wherein said windings form a plurality of successive laminations and where the yarn forming the windings of each lamination have constant tensile load resulting from the fluid under pressure in the inner thin-walled tubular layer.

* * * * *

UNITED STATES PATENT AND TRADEMARK OFFICE
CERTIFICATE OF CORRECTION

PATENT NO. : 4,106,528
DATED : August 15, 1978
INVENTOR(S) : Nikolaus Laing

It is certified that error appears in the above-identified patent and that said Letters Patent are hereby corrected as shown below:

Page 1, Item 30, change "[AU] Australia" to --[OE] Austria--

Signed and Sealed this

Twenty-seventh Day of February 1979

[SEAL]

Attest:

RUTH C. MASON
*Attesting Officer*

DONALD W. BANNER
*Commissioner of Patents and Trademarks*